July 8, 1958 — C. B. SIEBER — 2,841,995
VIBRATOR
Filed May 2, 1955 — 2 Sheets-Sheet 2

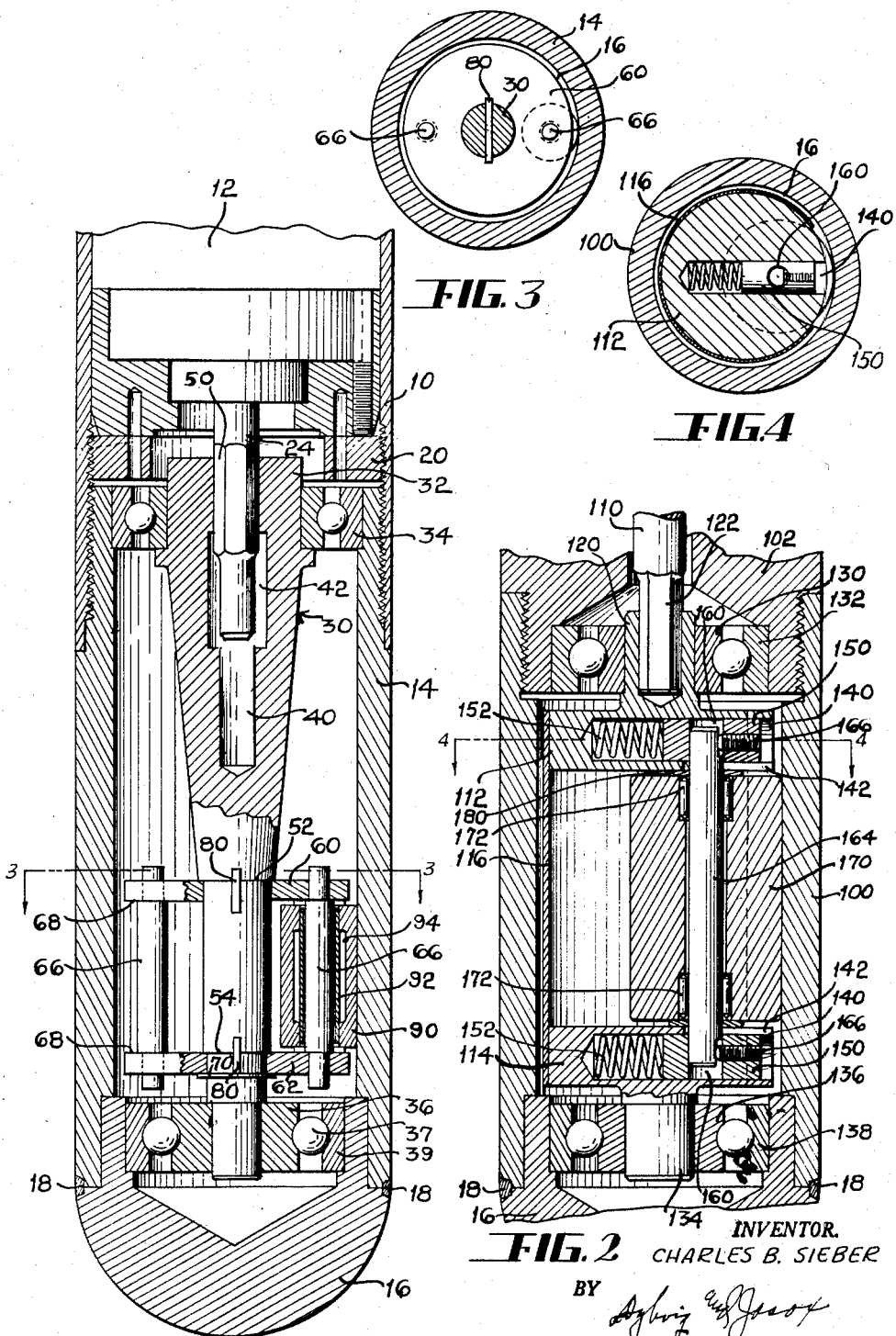

INVENTOR.
CHARLES B. SIEBER
BY
HIS ATTORNEYS

United States Patent Office 2,841,995
Patented July 8, 1958

2,841,995

VIBRATOR

Charles B. Sieber, Villa Park, Ill., assignor of one-half to Elmer R. Stitt, and one-half to William J. Miller, both of Dayton, Ohio Application May 2, 1955, Serial No. 505,308

3 Claims. (Cl. 74—87)

This invention relates to a vibrator and more particularly to a vibrator that may be used in vibrating concrete and other materials where vibrations are used to compact the material, although not necessarily so limited.

In the past, vibrators have been made for vibrating concrete and the like, wherein an eccentric weight mounted upon a rotating body is used to create the unbalanced condition. This eccentric weight may have either one or both ends supported in roller bearings, so that the force, in part at least, is transmitted from the eccentric weight through the bearings to the part that is to be vibrated. It is rather common practice to use a high speed motor, such as a universal motor, for rotating the part. In so doing, the bearings do not stand up for any great length of time. As a matter of fact, the life of a bearing may be on the order of a few hours.

An object of this invention is to provide a vibrator wherein the weight is driven in rotation, the weight exerting its force against the housing of the vibrator without transmitting the forces through the bearings. The mechanism for rotating the weight is preferably balanced, so that practically no unbalanced centrifugal forces act against the bearings. The weight may preferably consist of a revolving cylindrical or spherical mass traveling through a circular orbit, the mass being so mounted that it rolls on the inside of the cylindrical cavity of the housing. Thus, by causing the mass to travel through the orbit at a very high speed, the centrifugal forces act directly against the wall of the cylindrical cavity.

Another object of this invention is to provide a centrifugal weight that travels through a circular orbit, the weight being mounted upon bearings also traveling through a circular orbit. By this arrangement, bearings are provided for support of the centrifugal weight such that no unbalanced centrifugal forces of any substantial amount are transmitted to or through the bearings.

Other objects and advantages reside in the construction of parts, the combination thereof and the mode of operation, as will become more apparent from the following description.

In the drawings, Figure 1 is a cross sectional view of a portion of a vibratory device that may be used in compacting concrete, et cetera.

Figure 2 is a fragmentary cross sectional view of a portion of a modification.

Figure 3 is a cross sectional view taken substantially on the line 3—3 of Figure 1.

Figure 4 is a cross sectional view taken substantially on the line 4—4 of Figure 2.

Figure 5:
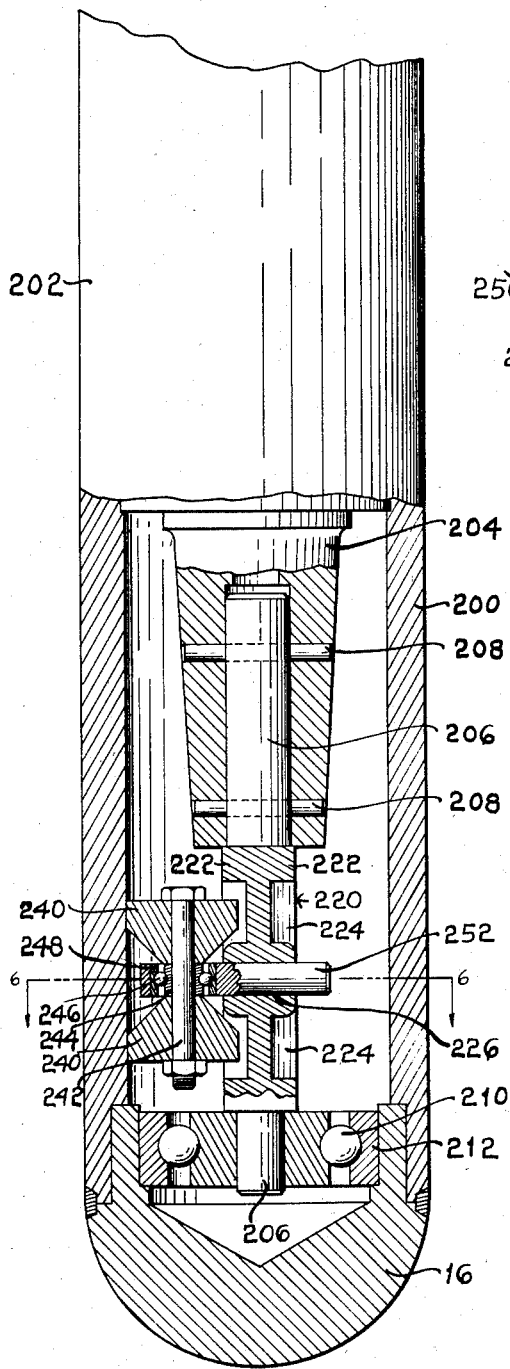

Figure 5 discloses a longitudinal cross sectional view of a portion of another modification.

Figure 6:
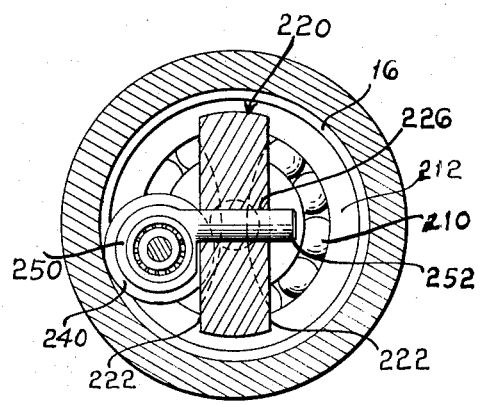

Figure 6 is a cross sectional view taken substantially on the line 6—6 of Figure 5.

Figure 7:
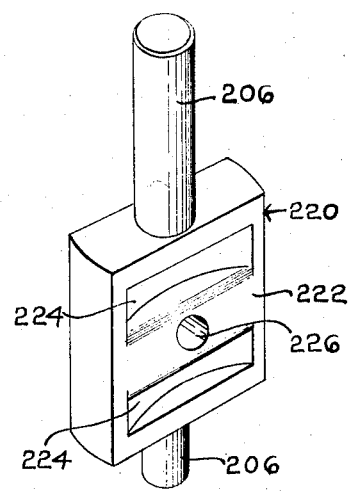

Figure 7 is a perspective view of a rotatably mounted support for the eccentric shown in Figure 5.

Figures 3, 4 and 7 are drawn to a smaller scale than Figures 1, 2, 5 and 6.

In the vibrator shown herein, an eccentric roller weight is rotatably mounted upon a bearing or bearings traveling through a circular orbit, the roller weight either with or without the bearing, or bearings, being permitted to move outwardly in response to centrifugal force, so that the roller weight will engage the interior of the cylindrical cavity of the housing surrounding the rollers. The mechanism for rotating the rollers is mounted in bearings that are not influenced to any great extent by the centrifugal force exerted by the rotating eccentric roller weight, since the centrifugal force exerted against the wall of the housing is not transmitted through the bearings to the housing, but is transmitted directly to the housing by means of the roller weight mounted for rotation in rolling engagement with the interior of the housing. This weight rotating about its own axis is driven by means of a concentrically disposed member that rotates and drives the roller weight and the parts associated therewith through a circular path, said driving means being rotatable about an axis concentric with the circular path.

Referring to the drawings, the reference character 10 designates a cylindrical shell having mounted therein a motor 12. The shell 10 terminates in a threaded portion threadedly engaging a cylindrical sleeve 14, forming the main housing for the vibratory mechanism. A semispherical plug 16 is welded at 18 to the housing 14. An externally threaded ring 20 confines the driving means in the cylindrical shell 10. A shaft 24 is used to drive or rotate the vibratory mechanism, which will now be described.

The vibratory mechanism includes a shaft 30 that tapers from the large end 32 mounted in bearings 34 seated in the housing 14. The reduced end of the shaft 30 is mounted in bearings 36 seated in a suitable rabbet in the inner hollow end of the plug 16. The shaft 30 is provided with a cylindrical recess 42. In order to reduce the mass, an aperture 40 extends in the center of the shaft 30. The shaft 24 is provided with a hexagonal portion 50 seated in a hexagonal aperture aligned with and above the cylindrical recess 42 and the aperture 40. From this it may readily be seen that as the shaft 24 rotates, the shaft 30 rotates.

The end of the tapered portion of the shaft 30 terminates in a shoulder 52. The shaft is also provided with a second shoulder 54. The portion of the shaft between the shoulders is cylindrical. Supporting means is mounted upon the cylindrical portion of the shaft. The supporting means includes a pair of discs 60 and 62 mounted on the shaft 30. The disc 60 abuts the shoulder 52 and the disc 62 abuts the shoulder 54. The discs 60 and 62 are provided with diametrically disposed apertures receiving the reduced ends of the shafts 66. Each of these shafts is provided with shoulders 68 abutting the discs 60 and 62 and holding these discs in fixed spaced relation. The disc 62 is prevented from endwise movement by spring washers 70 seated in an annular groove in the reduced portion of the shaft 30. The discs 60 and 62 are prevented from rotation by a pair of "Woodruff" keys 80, extending transversely through the shaft and seated in suitable notches in the discs, as may be clearly seen in Figure 3. The discs 60 and 62 and the two shafts or pins 66 are symmetrically arranged and substantially in balance, so that upon rotation of the shaft 30, the discs 60 and 62 may rotate without causing any appreciable unbalanced condition, and the shafts 66, being diametrically disposed and symmetrical, will counteract the centrifugal forces generated thereby.

One of the shafts 66 has mounted thereon a roller 90 provided with a porous bearing 92. The bearing 92 is press-fitted, or otherwise secured, in the ends of the roller 90. The roller 90 is provided with an annular recess 94 adapted to contain a suitable lubricant for supplying a lubricant to the bearing 92. Each of the ends of the bearing 92 is coated with lead, or is tinned, so as to prevent oil from oozing out through the ends of the bearing. The inside diameter of the bearing is slightly larger than the maximum diameter of the shaft 66, thus permitting limited floating movement of the roller. For example, if the diameter of the shaft is .25", the inside diameter of the bearing or bushing may then be .312". This is to permit limited movement of the roller 90 in response to centrifugal forces, so as to cause the roller 90 to roll in contact with the inside of the cylindrical member 14 without exerting an outward thrust on the pin 66. Thus, it may be seen that as the shaft 30 is rotated by the driving force 12, centrifugal force is exerted on the inside of the housing 14 without exerting a centrifugal force upon the bearings supporting the shaft 30. If, for example, the shaft 30 rotates on the order of 15,000 R. P. M., the roller 90 may then rotate at a speed of 30,000 to 35,000 R. P. M., depending upon the relative size of the parts and the friction losses.

It has been found that this arrangement of a centrifugal weight greatly prolongs the life of the bearings and thereby prolongs the life of the vibrator.

In the modification disclosed in Figure 2, another arrangement of an eccentric weight has been shown, wherein the unbalanced centrifugal forces exerted by the weight are not transmitted through to the outside cylindrical housing through any of the bearings in the vibratory head. This modification will now be described.

In the modification disclosed in Figure 2, a cylindrical housing 100 has threadedly secured thereto a member 102 that may be a part of the driving force housing. The opposite end of member 100 has attached thereto a plug 16 by means of a weld 18, similar to that disclosed in connection with the preferred embodiment. A shaft 110 drives the vibrating mechanism, which will now be described.

In this modification, a cradle or supporting means consists of support members 112 and 114 and an intermediary member 116. Member 116 may be brazed, welded or otherwise attached to members 112 and 114. As may best be seen by referring to Figure 4, member 116 subtends an angle of approximately 285°. Member 112 is provided with an extension 120 provided with a hexagonal bore receiving a hexagonal end 122 of the shaft 110. The outer periphery of the extension 120 has mounted thereon the inner race 130 of a bearing having the outer race 132 mounted in the frame member 102. Member 114 is provided with an extension 134 having mounted thereon the inner race 136 of a bearing having the outer race 138 mounted in a rabbet in plug 16.

Members 112 and 114 have each been provided with a radially disposed aperture or bore 140, extending inwardly from one side of each of these members, the bores 140 being symmetrically disposed with respect to the margins of the intermediary member 116. One side of each bore is provided with a radial slot 142. A pair of cylindrical members 150, one for each of the bores 140, is mounted for radial movement in the respective bores. A pair of light springs 152 are mounted in the bottom of the bore and urge members 150 radially and outwardly, as viewed in Figure 2. Members 150 are each provided with a transverse bore 160, in which is seated the flattened ends of a shaft 164, held in position by set screws 166 threadedly engaging suitable apertures in the ends of member 150. The shaft 164 supports an eccentrically mounted floating roller 170 mounted upon bearings 172 positioned between the shaft 164 and suitable rabbets, functioning as outer races in the roller 170. The springs 152 bias or urge the roller 170 into contact with the inner cylindrical cavity of housing member 100.

As the shaft 110 is driven by a motor or through a flexible cable, as the case may be, it may be readily seen that the floating roller 170 is rotated in contact with the inner wall of the cylindrical cavity in housing member 100. The roller 170, so to speak, floats with respect to the support members 112 and 114, in that as the shaft 110 is rotated, the centrifugal force urges the roller 170 outwardly and radially with respect to the longitudinal axis of rotation of the shaft 110. Cylindrical members 150 are slidably mounted in the bores 140, so that any centrifugal force exerted by the roller 170 is not transmitted to the bearings supporting members 112 and 114. Due to the fact that the shaft 164 is free to float radially, it can readily be seen that the centrifugal force of the shaft 164 has no effect upon the bearings supporting members 112 and 114. The only centrifugal force that may be imparted to these bearings is the unbalanced condition existing in the frame structure including members 112, 114 and 116. Suitable spacing washers 180 have been positioned between the ends of the roller 170 and members 112 and 114 respectively.

In the modification disclosed in Figure 5, a cylindrical shell or housing 200 may have a driving force mounted in the solid portion 202 which is drivingly connected to a mechanism for imparting centrifugal forces to the inner cylindrical wall of member 200, which will now be described. The driving force drives a frustum-conical hollow shaft 204, that has mounted therein a stub-shaft 206. One end of the shaft-like member 206 projects into a tubular recess or aperture in the frustum-conical member 204 and is keyed thereto by means of a pair of keys or pins 208. The lower end of the shaft 206 is mounted in bearings 210, the outer race 212 being positioned in a rabbet in the plug 16, identical to that described in connection with the preferred modification.

The shaft 206 has been turned out of a piece of metal and provided with a sector 220 of a cylinder. This sector has a pair of oppositely disposed facets 222 that are parallel to each other. The facets 222 have been provided with a pair of arcuate trough-like recesses 224. An aperture 226 extends transversely through the center of the cylindrical sector 220.

The eccentric used in transmitting centrifugal force to the inner wall of member 200 includes a pair of rollers 240 mounted upon a suitable transverse bolt or pin 242 supported in the inner race 244 of a roller bearing 246 having the outer race 248 mounted in a ring 250 integral with a cylindrical pin 252 extending through the aperture 226. The pin 252 is offset, so that the rollers 240 and the supporting structure function in a manner similar to a caster. The rollers 240 project into the trough-like recesses 224. This is to provide sufficient clearance so as to concentrate a considerable amount of weight eccentrically mounted.

As the driving force drives the frustum-conical member 204 and the shaft 206 in a clockwise direction, as viewed in Figure 6, the rollers 240 will be thrust outwardly by centrifugal force, so as to exert a pressure against the inner cylindrical cavity or wall of the cylindrical housing 200. Due to the fact that the rollers are symmetrically mounted with respect to the bolts or pins 242, no centrifugal force will be transmitted directly to the bearing 246. Likewise, the centrifugal force exerted by the rollers 240 will not influence the bearings 210 in which the shaft 206 is mounted.

Although the vibrator described herein discloses a motor, the vibrator could be driven in any other suitable manner, either directly or indirectly, from any suitable source of power, such as electric motor, pneumatic or hydraulic motor, internal combustion engine, steam engine or any other source of energy.

In each of the modifications disclosed herein, the entire eccentric weight, shaft and bearing assembly may be inserted and removed from the driving force end of the cylindrical sleeve.

Due to the fact that the center of gravity of the eccentric mass is further removed from the axis of rotation than the eccentric mass of vibrators now on the market, the effectiveness of the arrangement of the various disclosures herein is far greater than those now in use.

Although the preferred embodiment of the device has been described, it will be understood that within the purview of this invention various changes may be made in the form, details, proportion and arrangement of parts, the combination thereof and mode of operation, which generally stated consists in a device capable of carrying out the objects set forth, as disclosed and defined in the appended claims.

Having thus described my invention, I claim:

1. A vibrator for use in vibrating concrete, said vibrator including a housing having a cylindrical cavity, means for vibrating the housing, said means including a rotatably mounted member supported in bearings concentrically mounted in the housing, said member having a tapering portion terminating in a cylindrical portion near one end of the cylindrical cavity, supporting means connected to said cylindrical portion, said supporting means being in substantial balance with respect to said member, roller means eccentrically mounted in contact with said housing near one end thereof and upon said supporting means for rotation through a circular path concentric with said cylindrical cavity, said roller means being mounted for radial movement upon said supporting means and rotating therewith, eccentrically mounted bearing means for said roller means mounted upon said supporting means for radial movement with the roller means so that the roller means traveling through a circular path are forced by centrifugal force into rolling contact with the cylindrical cavity in the housing to thereby vibrate the housing.

2. A vibrator according to claim 1, wherein the supporting means includes a pair of disc members mounted upon the cylindrical portion of the rotatably mounted member, said disc members having a pair of diametrically disposed pins extending parallel to the longitudinal axis of the rotating member and wherein the roller means and the bearing therefor is mounted upon one of said pins, the inner diameter of the bearing being greater than the outer diameter of the pin so as to permit radial movement of the roller means without exerting a force upon the pin so as to exert vibratory movement to one end of the housing.

3. A vibrator according to claim 1, wherein the supporting means includes a pair of disc members mounted upon the cylindrical portion of the rotatably mounted member, said disc members having a pair of diametrically disposed pins extending parallel to the longitudinal axis of the rotating member and wherein the roller means includes a roller and a porous metal bearing mounted upon one of said pins, the ends of the porous metal bearing being solid, the roller having a cylindrical cavity surrounding the mid portion of the bearing to provide a cavity for a lubricant.

References Cited in the file of this patent

UNITED STATES PATENTS

| 2,490,122 | Glegg | Dec. 6, 1949 |

FOREIGN PATENTS

| 169,448 | Austria | Nov. 10, 1951 |
| 516,458 | Belgium | Jan. 15, 1953 |